US006927972B1

(12) United States Patent
Wang et al.

(10) Patent No.: US 6,927,972 B1
(45) Date of Patent: Aug. 9, 2005

(54) CONCEALED TYPE HOOK STRUCTURE ADAPTED TO SECURE A PORTABLE COMPUTER TO A BASE MEMBER

(75) Inventors: Wen-Chieh Wang, Taipei (TW); Chang-Ming Yan, Taipei (TW); Chao-Ming Huang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/950,459

(22) Filed: Sep. 28, 2004

(30) Foreign Application Priority Data

Apr. 13, 2004 (TW) ............................... 93205645 U

(51) Int. Cl.⁷ ................................................ G06F 1/16
(52) U.S. Cl. ..................................................... 361/683
(58) Field of Search ............................... 292/121–128, 292/95, 340; 320/11; 361/679–681, 683, 361/686, 724–727, 801; 710/303, 304

(56) References Cited

U.S. PATENT DOCUMENTS

| | | | | |
|---|---|---|---|---|
| 2,325,225 A | * | 7/1943 | Burke | ........................ 292/123 |
| 5,465,191 A | * | 11/1995 | Nomura et al. | ............. 361/681 |
| 5,518,282 A | * | 5/1996 | Sawada | ....................... 292/252 |
| 6,122,152 A | * | 9/2000 | Goto et al. | ..................... 361/1 |
| 6,125,040 A | * | 9/2000 | Nobuchi et al. | ............. 361/726 |
| 6,256,194 B1 | * | 7/2001 | Choi et al. | ................... 361/683 |
| 6,517,129 B1 | * | 2/2003 | Chien et al. | .............. 292/251.5 |
| 6,762,928 B2 | * | 7/2004 | Lo | ............................... 361/681 |
| 6,870,740 B2 | * | 3/2005 | Hsu et al. | .................... 361/732 |

\* cited by examiner

*Primary Examiner*—Lynn Feild
*Assistant Examiner*—Zachary Pape
(74) *Attorney, Agent, or Firm*—Bacon & Thomas PLLC

(57) ABSTRACT

A concealed type hook structure includes a base member, a portable computer, and a hook assembly mounted in a locating hole of the base member for locking the portable computer to the base member, the hook assembly having a hook holder, a swivel hook pivoted to the hook holder, a pressure plate for biasing the swivel hook to force the swivel hook into engagement with the portable computer upon pressing of the portable computer on the base member, and a return unit for moving by the user to return the pressure plate and to further disengage the swivel hook from the portable computer.

10 Claims, 5 Drawing Sheets

US 6,927,972 B1

CONCEALED TYPE HOOK STRUCTURE ADAPTED TO SECURE A PORTABLE COMPUTER TO A BASE MEMBER

BACKGROUND OF THE INVENTION

1. Field of the Invention

The present invention relates to a concealed type hook structure and more particularly, to a concealed type hook structure for use in a base member to lock a portable computer.

2. Description of Related Art

A portable computer, for example, a table PC may be used with a base member having a keyboard. The base member has a hook structure for locking the tablet PC to the base member. This design of hook structure is bulky, thereby occupying much installation space in the base member. In order to receive the bulking hook structure, the tablet PC must be specially designed. Further, this design of hook structure is not a concealed type.

Therefore, it is desirable to provide a concealed type hook structure that eliminates the drawbacks of the aforesaid conventional design.

SUMMARY OF THE INVENTION

The present invention has been accomplished under the circumstances in view. It is therefore the main object of the present invention to provide a simple design of concealed type hook structure for use in a base member to secure a portable computer, which automatically locks the portable computer upon pressing of the portable computer on the base member.

To achieve this and other objects and according to one aspect of the present invention, the concealed type hook structure is comprised of a base member, a portable computer, and a hook assembly. The base member comprises at least one working slot and at least one block thereof. The portable computer comprises a hooking hole corresponding to said working slot of said base member, and at least one locating hole corresponding to the aforesaid locating blocks of the base member. The hook assembly is mounted in at least one working slot of the base member for hooking in the hooking hole of the portable computer to lock the portable computer to the base member. The hook assembly comprises a hook holder, the hook holder comprising a first coupling portion and a second coupling portion; a swivel hook, the swivel hook comprising a first operating portion disposed at one end thereof, a hook portion disposed at an opposite end thereof and adapted to hook the hooking hole of the portable computer, a first coupling device pivoted to the first coupling portion of the hook holder; a torsional spring, torsional spring mounted in said hook holder and coupled between said hook holder and said swivel hook to keep the hook portion of the swivel hook upward; a pressure plate, the pressure plate comprising a press block protruded upwardly thereof, an operating portion disposed at one end thereof and pressed on the operating portion of the swivel hook to keep press block higher than the top face of base member a second coupling device disposed at an opposite end thereof and pivoted to the second coupling portion of the hook holder; and a spring member, said spring member mounted in said hook holder and coupled between said pressure plate and said hook holder to keep said press block of the pressure plate higher than the top face of said base member. When placed the portable computer on the top face of the base member, the at least one locating block of said base member is engaged into the at least one locating hole of said portable computer, and the press block of the pressure plate is depressed by the weight of the portable computer to bias said pressure plate downwardly to move the operating portion of said pressure plate away from the operating portion of the swivel hook, thereby causing the hooked portion to rotate upwardly and hook in the corresponding hooking hole of the portable computer. Because the swivel hook is small and concealed, the portable computer does not need extra design to coordinate the hook assembly.

Referring to the aforesaid method of a first coupling device of swivel hook pivoted to the first coupling portion of the hook holder and the method of a second coupling device of pressure plate pivoted to the second coupling portion of the hook holder, a pivot hole is preferably formed.

According to still another aspect of the present invention, the pressure plate further comprises a through hole and a pressure block which used to press more easily; the hook holder further comprises an upright rod inserted through the through hole of the pressure plate, and a spring member sleeved onto the upright rod and stopped between the hook holder and the pressure plate.

According to still another aspect of the present invention, the concealed type hook structure further comprises a return unit axially slidably mounted in the hook holder. The return unit comprises an operating portion for operation by the user to move the return unit relative to the pressure plate, a push block for pushing the pressure plate, a round rod, a return spring mounted on the round rod and stopped between the return unit and the hook holder, and a first sliding block and second sliding block disposed at two sides and respectively coupled to the hook holder to guide axial movement of the return unit relative to the hook holder.

According to still another aspect of the present invention, the hook holder comprises a receiving chamber adapted to accommodate the round rod and return spring of the return unit.

It is to be understand that both the foregoing general description and the following detailed description are exemplary and explanatory and are intended to provide further explanation of the invention as claimed.

DETAILED DESCRIPTION OF THE PREFERRED EMBODIMENT

Figure 1:
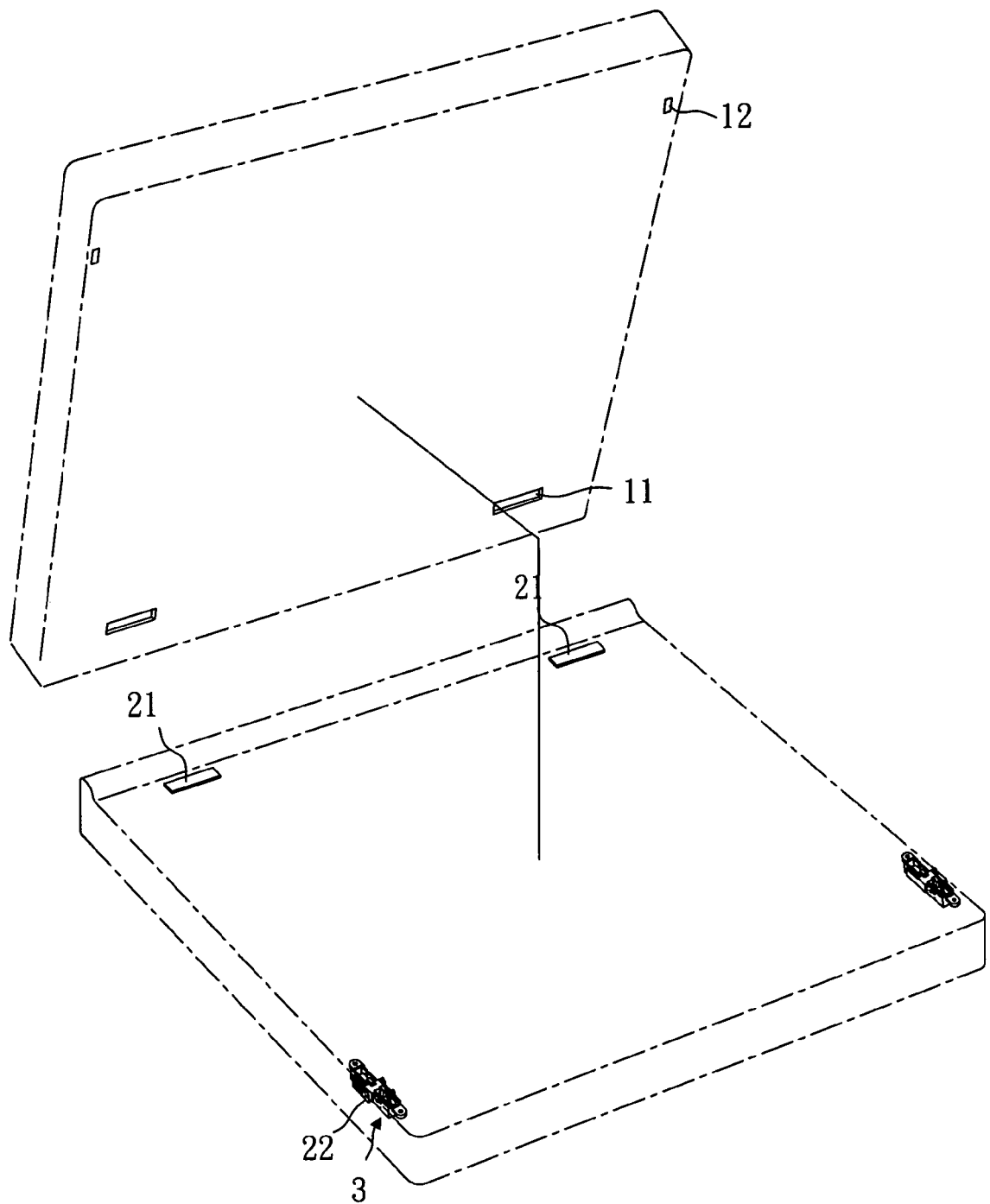
FIG. 1 is a schematic drawing showing the relationship between a tablet PC and a base member before connection according to the present invention.

Referring to FIG. 1, the invention comprises a portable computer, for example, a tablet PC 1, a base member 2, and two hook assemblies 3. The base member 2 is provided with a keyboard (not shown), two locating blocks 21 and two working slots 22 on the top face thereof. Each hook assembly 3 is mounted in the working slot 22. The tablet PC 1 comprises two locating holes 11 respectively connectable to the locating blocks 21 of the base member 2, and two hooking holes 12.

Figure 2:
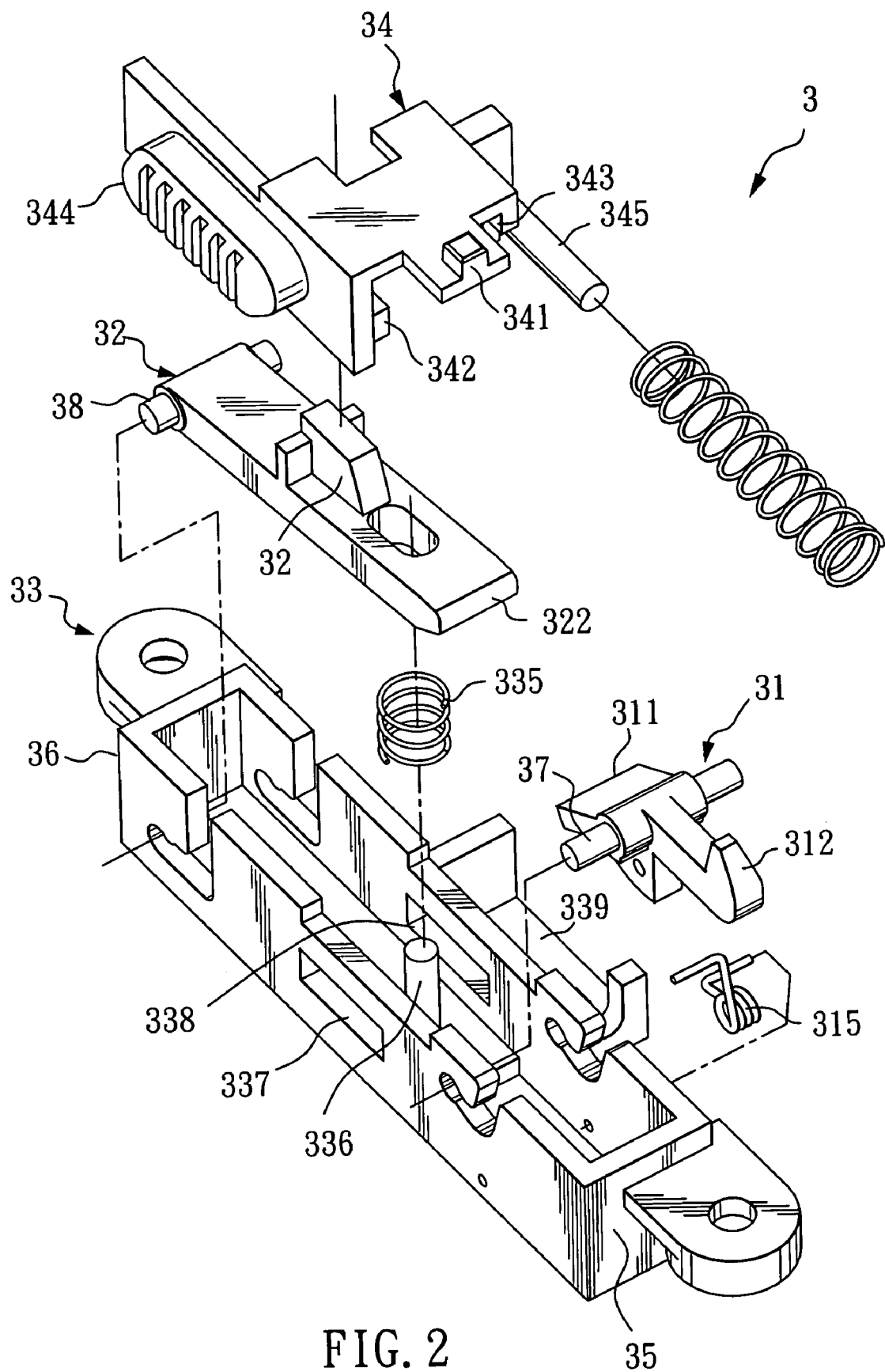
FIG. 2 is an exploded view of a hook assembly according to the present invention.

Referring to FIG. 2, the hook assembly 3 comprises a swivel hook 31, a pressure plate 32, and a hook holder 33. The hook holder 33 comprises a first coupling portion 35, a second coupling portion 36, an upright rod 336, a torsional spring 315, a spring member 335, a first sliding track 337, a second sliding track 338, and a receiving chamber 339. According to this embodiment, the first coupling portion 35 and the second coupling portion 36 are pivot holes. The compression spring 315 is mounted on the upright rod 336 and adapted to impart a spring prestress to the pressure plate 32. The swivel hook 31 comprises an operating portion 311 disposed at one end thereof, a hook portion 312 disposed at the other end thereof, and a pivot rod 37 transversely disposed on the middle and pivotally coupled to the first coupling portion 35 of the hook holder 33. Spring member 335 mounted in hook holder 33 and coupled between pressure plate 32 and hook holder 33 to keep press block 21 of the pressure plate 32 higher than the top face of base member 2. The pressure plate 32 is pressed on the spring member 335, comprising an operating portion 322 disposed at one end thereof and pressed on the operating portion 311 of the swivel hook 31, a pivot rod 38 disposed at the opposite end thereof and pivotally coupled to the second coupling portion 36 of the hook holder 33, a top block 321, and a through hole 325 disposed between the top block 321 and the operating portion 322 and coupled to the upright rod 336 to pass through the through hole 325.

Figure 3:
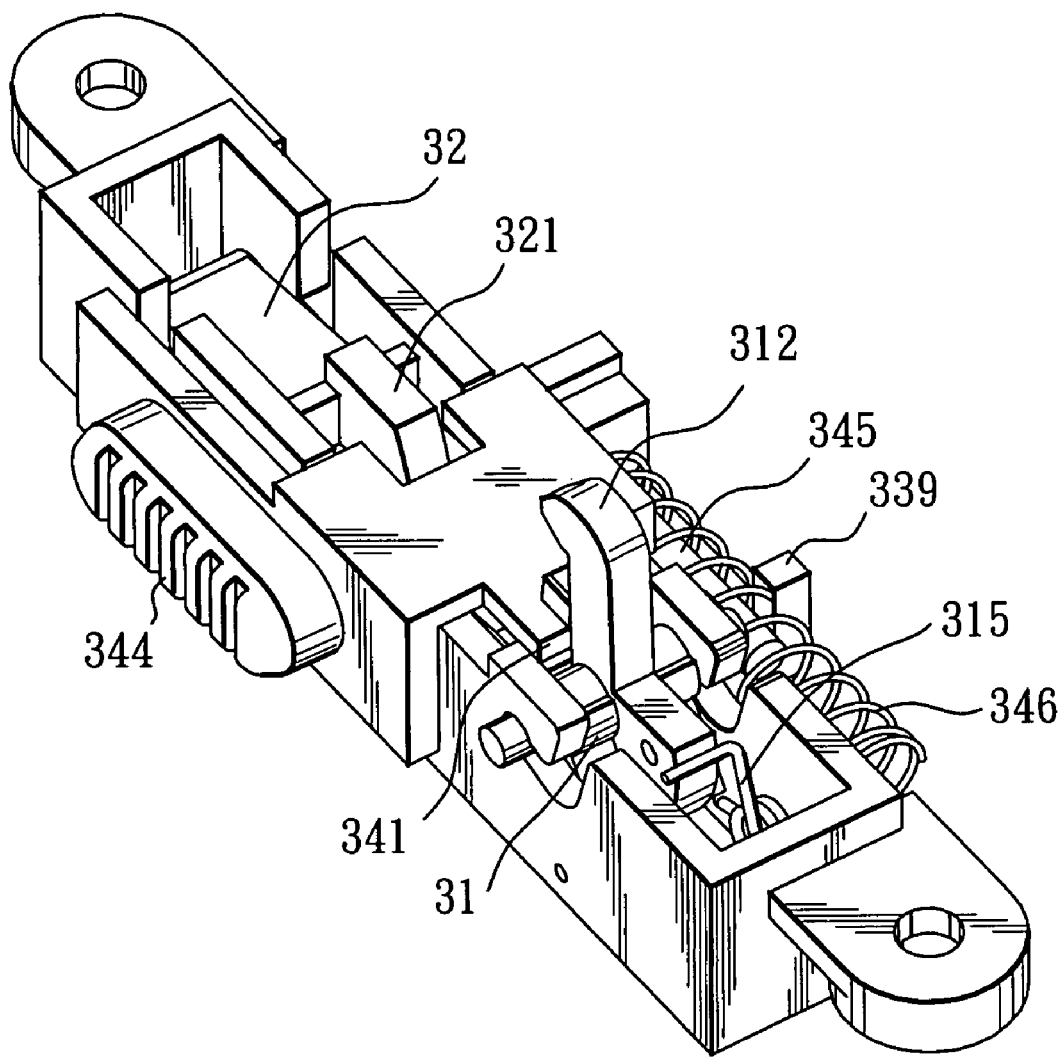
FIG. 3 is a perspective assembly view of the hook assembly according to the present invention.

Referring to FIG. 3 and FIG. 2 again, the return unit 34 is axially slidably mounted in the hook holder 33, comprising an operating portion 344, a push block 341, a round rod 345 suspending in the receiving chamber 339 of the hook holder 33 and supporting a return spring 346 in the receiving chamber 339 (see FIG. 3), a first sliding block 342 coupled to the first sliding track 337 of the hook holder 33, and a second sliding block 343 coupled to the second sliding track 338 of the hook holder 33.

Figure 4A:
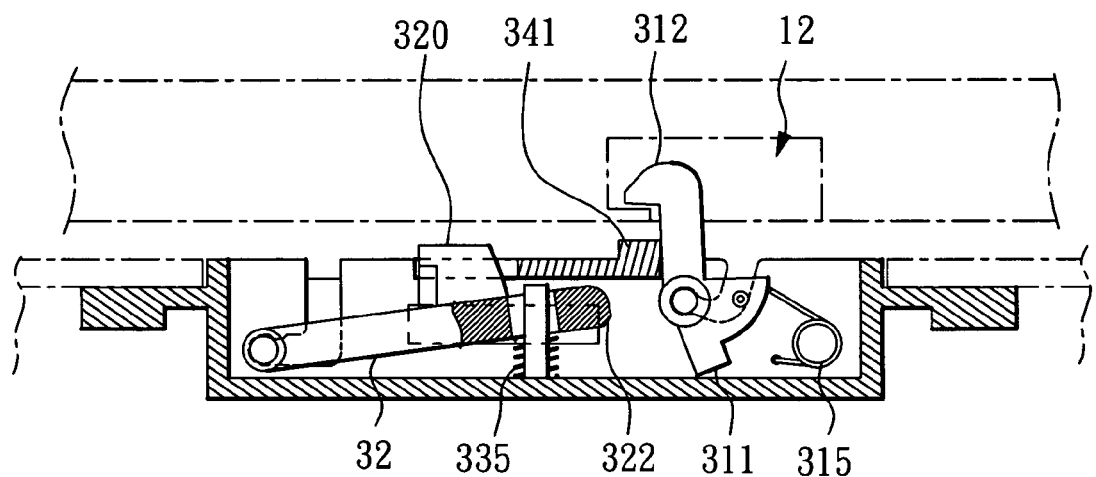
FIG. 4a is a sectional view of the present invention showing the locking status of the swivel hook.

Referring to FIG. 4a, the tablet PC 1 is pressed on the press block 321 of the pressure plate 32 to release the spring prestress of the spring member 335, thereby causing the pressure plate 32 to bias the swivel hook 31 in one direction through 90° and to further force the hooked portion 312 into engagement with the hooking hole 12 of the tablet PC 1. At this time, the front side of the hooked portion 312 is stopped against the push block 341 (see FIG. 4a), the rear side of the hooked portion 312 is forced forwards by the torsional spring 315, and therefore the swivel hook 31 is maintained in a balanced status to secure the tablet PC 1 to the base member 3 positively.

Figure 4B:
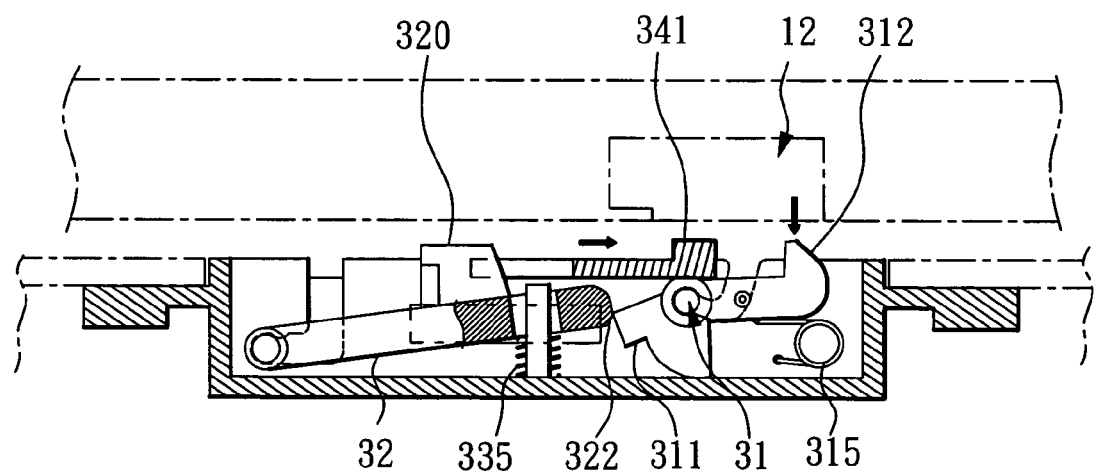
FIG. 4b is similar to FIG. 4a but showing the swivel hook turned to the unlocking position.
Figure 5:
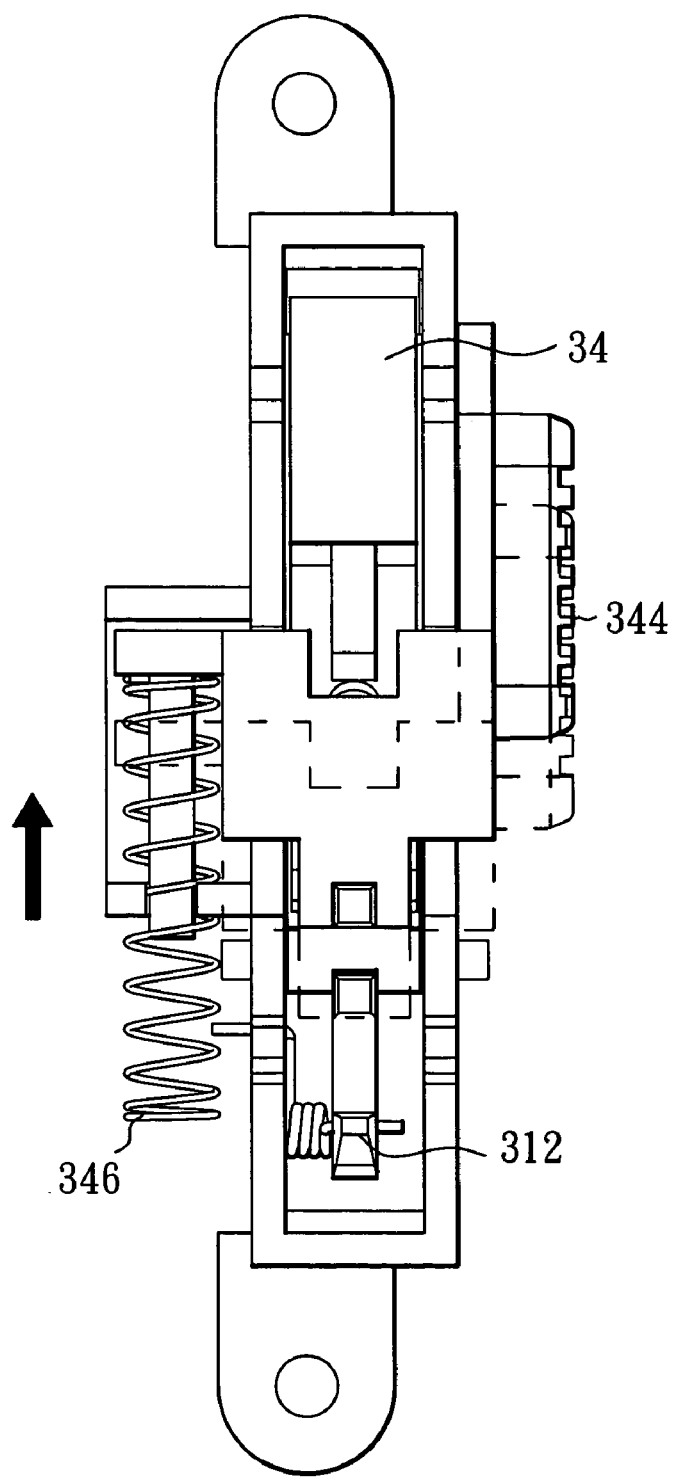
FIG. 5 is a schematic drawing of the present invention showing the return stroke of the return unit.

Referring to FIGS. 4b and 5 and FIG. 4a again, when moving the operating portion 344 of the return unit 34 to force the push block 341 against the swivel hook 31 and to turn the hooked portion 312 from the vertical position (the locking position where the hooked portion 312 is hooked in the hooking hole 12 of the tablet PC 1 as shown in FIG. 4a) to a horizontal position (the unlocking position where the hooked portion 312 is disengaged from the hooking hole 12 of the table PC 1 (as shown in FIG. 4b), the spring prestress of the return spring 346 return the return unit 34 to the former position (see FIG. 5).

Although the present invention has been explained in relation to its preferred embodiment, it is to be understood that many other possible modifications and variations can be made without departing from the spirit and scope of the invention as hereinafter claimed.

What is claimed is:

1. A concealed type hook structure comprising:
a base member, said base member having a top face, at least one working slot and at least one locating block thereof;
a portable computer, said portable computer comprising at least one hooking hole corresponding to said at least one working slot of said base member, and at least one locating hole corresponding to said at least one locating block of said base member; and
at least one hook assembly mounted in said at least one working slot of said base member for hooking in said at least one hooking hole of said portable computer to lock said portable computer to said base member;
wherein each of said hook assembly comprises:
a hook holder, said hook holder comprising a first coupling portion and a second coupling portion;
a swivel hook, said swivel hook comprising an operating portion disposed at one end thereof, a hook portion disposed at an opposite end thereof and adapted to hook said hooking hole of said portable computer, and a coupling device pivoted to said first coupling portion of said hook holder;
a pressure plate, said pressure plate comprising a press block protruded upwardly thereof, an operating portion disposed at one end thereof and pressed on the operating portion of said swivel hook, and a coupling device disposed at an opposite end thereof and pivoted to said second coupling portion of said hook holder; and
a spring member, said spring member mounted in said hook holder and coupled between said pressure plate and said hook holder to keep said press block of the pressure plate higher than the top face of said base member;
when placed said portable computer on the top face of said base member, the at least one locating block of said base member is engaged into the at least one locating hole of said portable computer, and the press block of said pressure plate is depressed by the weight of said portable computer to bias said swivel hook, thereby causing said hook portion of said swivel hook to rotate upwardly and hook in said corresponding hooking hole of said portable computer.

2. The concealed type hook structure as claimed in claim 1, wherein said portable computer is a tablet PC.

3. The concealed type hook structure as claimed in claim 1, wherein said first coupling portion of said hook holder is a pivot hole, and the coupling device of said swivel hook is a pivot pivotally coupled to the pivot hole of said first coupling portion of said hook holder.

4. The concealed type hook structure as claimed in claim 1, wherein said second coupling portion of said hook holder is a pivot hole, and the coupling device of said pressure plate is a pivot pivotally coupled to the pivot hole of said second coupling portion of said hook holder.

5. The concealed type hook structure as claimed in claim 1, further comprising a torsional spring mounted in said hook holder and coupled between said hook holder and said swivel hook to keep said hook portion of the swivel hook upward.

6. The concealed type hook structure as claimed in claim 1, wherein said pressure plate further comprises a through hole disposed adjacent to the operating portion thereof.

7. The concealed type hook structure as claimed in claim 6, wherein said hook holder further comprises an upright rod spaced between said first coupling portion and said second coupling portion and inserted through said through hole of said pressure plate, and said spring member sleeved onto said upright rod and stopped between said hook holder and said pressure plate.

8. The concealed type hook structure as claimed in claim 1, further comprising a return unit axially slidably mounted in said hook holder, said return unit comprising an operating portion to move said return unit relative to said hook holder, a push block for pushing the hook portion of said swivel hook backward, a round rod, a return spring mounted on said round rod and stopped between said return unit and said hook holder, and a first sliding block and second sliding block disposed at two sides thereof and respectively slidably coupled to said hook holder to guide axial movement of said return unit relative to said hook holder.

9. The concealed type hook structure as claimed in claim 8, wherein said hook holder comprises a first sliding track and a second sliding track respectively slidably coupled to said first sliding block and said second sliding block of said return unit.

10. The concealed type hook structure as claimed in claim 8, wherein said hook holder comprises a receiving chamber adapted to receive said round rod and said return spring of the return unit.

* * * * *